E. R. IVES,

Assignor to IVES, BLAKESLEE, & Co.

Automatic Toy.

No. 9,370. Reissued Sept. 7, 1880.

*Witnesses:-*

Louis M. T. Whitehead.

Fred T. Haynes

*Inventor:*

Edward R. Ives by his Attorneys

Brown & Brown

N. PETERS, PHOTO-LITHOGRAPHER, WASHINGTON, D. C.

UNITED STATES PATENT OFFICE.

EDWARD R. IVES, OF BRIDGEPORT, CONNECTICUT, ASSIGNOR TO IVES, BLAKESLEE & CO.

AUTOMATIC TOY.

SPECIFICATION forming part of Reissued Letters Patent No. 9,370, dated September 7, 1880.

Original No. 176,961, dated May 2, 1876. Application for reissue filed May 31, 1880.

*To all whom it may concern:*

Be it known that I, EDWARD R. IVES, of Bridgeport, in the county of Fairfield and State of Connecticut, have invented certain new and useful Improvements in Toys, of which the following is a specification.

My invention consists in the combination, in a toy locomotive, of wheels representing driving-wheels, an axle for the same, cylinders, pitman-rods having motion imparted to them by the wheels, a whistle, and a crank operated by the rotation of the wheels and serving to actuate the whistle.

My invention also consists in the combination, in a toy locomotive, of wheels representing driving-wheels, an axle for the same, cylinders, pitman-rods having motion imparted to them by the wheels, a whistle, a crank operated by the rotation of the wheels and serving to actuate the whistle, and spring mechanism for propelling the toy.

Figure 1:
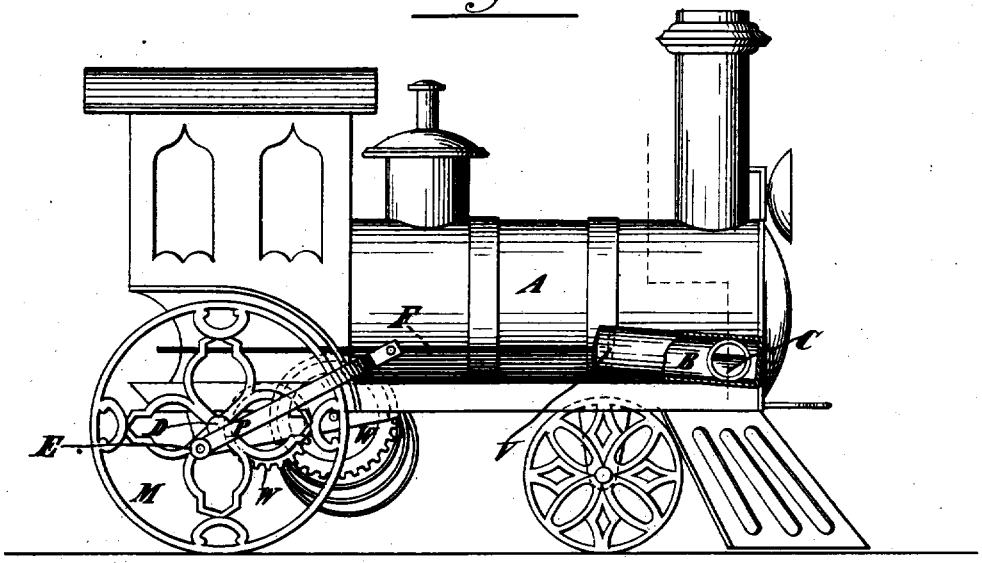
Figure 2:
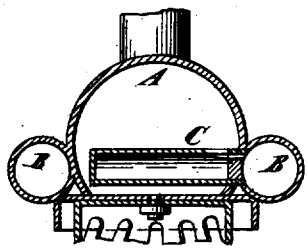

In the annexed drawings, making part of this specification, Figure 1 represents a side view of a toy locomotive embodying my invention; and Fig. 2 is a cross-section of the body and cylinders, showing the connection of a whistle or sound-producing device with them.

In the figures, A represents the body of the toy locomotive, which may be constructed in any ornamental style or similar to any of those in use. This locomotive is shown as provided with suitable clock machinery or any series of wheels, W, actuated by spring or other power. This train of wheels W connects with the axle of the wheels M, occupying the position of the driving-wheels of an ordinary locomotive, and imparts motion to them. Pitman-rods P, which have motion imparted to them from the wheels M, are connected to rods F, which work through the ends of the cylinders B. One of the rods F is shown as provided with a piston, V, working in its cylinder B. When this piston moves backward in the cylinder it draws in air at one stroke, and when it moves forward forces it out through a whistle or sound-producing device, C, connected to the other end of the cylinder. By connecting a whistle or sound-producing device to each cylinder continuous sound may be made.

It will be seen that the pitman which operates the piston V is connected to the wheel M, which actuates it, at some distance from the axle D, to which the said wheel is affixed, and hence that a crank, E, is formed, and that said shaft is therefore provided with a crank, which operates during the rotation of the wheels.

A bellows may be introduced, if more desirable, in place of the piston, and the arrangement may be such that different tones may be produced by changing the size of the apertures, and more than one whistle may be employed with good effect.

What I claim as my invention, and desire to secure by Letters Patent, is—

1. The combination, in a toy locomotive, of wheels representing driving-wheels, an axle for the same, cylinders, pitman-rods having motion imparted to them by the wheels, a whistle, and a crank operated by the rotation of the wheels and serving to actuate the whistle.

2. The combination, in a toy locomotive, of wheels representing driving-wheels, an axle for the same, cylinders, pitman-rods having motion imparted to them by the wheels, a whistle, a crank operated by the rotation of the wheels and serving to actuate the whistle, and spring mechanism for propelling the toy.

EDWARD R. IVES.

Witnesses:

CHAS. A. HOTCHKISS,

WM. L. HORR.